March 9, 1971  L. O. LIEBERG  3,568,285

LAMINATE ROLLING DEVICE

Filed Aug. 7, 1969

INVENTOR
LAURIE O. LIEBERG
BY Martin D. Wittstein
ATTORNEY

United States Patent Office 3,568,285
Patented Mar. 9, 1971

3,568,285
LAMINATE ROLLING DEVICE
Laurie O. Lieberg, 447 Meadow St.,
Fairfield, Conn. 06430
Filed Aug. 7, 1969, Ser. No. 848,280
Int. Cl. B05c 1/08
U.S. Cl. 29—110.5                    6 Claims

ABSTRACT OF THE DISCLOSURE

A rolling device for applying bonding pressure in the formation of special adhesively secured laminates. A heavy elongate pressure roller is mounted on a rigid frame having a first handle projecting rearwardly and a second handle projecting upwardly, both handles being fixedly secured to the frame, whereby longitudinal or forward and backward moving forces are applied to the first handle and simultaneously downward forces are applied to the second handle to obtain high bonding pressure on the surface of the outer layer of the laminate.

BACKGROUND OF THE INVENTION

This invention relates generally to pressure rolling devices and more particularly to such devices particularly adapted for applying bonding pressure in the formation of various laminated members.

As is well known in the cabinet and furniture making arts, among others, it is common practice to form a panel, counter top, door, wall member, as well as other components, from two or more layers of flat material which are adhesively secured to each other by a bonding agent to form a laminate. As typical well recognized examples, many kitchen counters and cabinets found in homes, and counters and tables used in restaurants, are made up of a base layer of wood, fibre board or other suitable rigid base stock to which a suitable thermosetting plastic transparent or printed sheet, such as the well known Formica, is adhesively secured. Various items of furniture are typically overlaid on tops with Formica or other plastic coverings to act as a protective shield for the otherwise bare wood top. As will immediately be apparent, most of the utility items, those above mentioned as well as others, are custom made to fit the particular needs of the installation as well as the peculiar tastes of the purchaser, although stock manufactured items having such plastic finish coverings thereon are becoming more frequently available, particularly in stock furniture.

In the field of customizing the utility items having laminated structures, a major problem is encountered in the process of satisfactorily bonding the plastic layer to the base layer. Generally, in applying the plastic layers such as Formica, the base stock and the plastic layer, after each has been cut to the desired shape, are coated with a suitable bonding agent which possesses great strength and durability, after which the respective sheets are joined together as by laying the plastic layer over the base stock. In order to achieve a good bond, however, it is essential that the laminate be subject to pressure over the entire surface of the laminate. The necessity for applying pressure is to exclude any air pockets or bubbles which may have been trapped between the adjacent surfaces of the plastic layer and the base stock, as well as to achieve intimate contact between the layer of bonding agent and the adjacent surfaces of the plastic layer and the base stock. If air bubbles are allowed to remain entrapped between the layers, the outer highly polished surface of the plastic layer may have a rippled or bumpy appearance. In addition, if intimate contact is not achieved at the interface of the laminate layers, ultimate separation will occur which is extremely difficult, if not altogether impossible, to correct.

It will be recognized that in the limited area of manufacturing stock items in large quantities, little difficulty is encountered in obtaining necessary bonding pressures since the manufacturer has the capability as well as the financial resources to provide automatic presses in which the laminate components are formed. However, in the relatively large area of custom made laminated items, the situation is entirely different. In this field two production aspects combine to create a very significant problem, the first being that each item made is generally different, at least to some extent, than other items in size, shape, etc. with the result that it is relatively impossible to use high power automated presses which have been designed to accommodate some standard range of piece sizes. Secondly, even if a large press is suitable for use on a variety of custom made parts, it is usually quite expensive to purchase and maintain, and the average or typical cabinet maker, small custom furniture maker or custom laminating shop can rarely justify such expense.

SUMMARY OF THE INVENTION

Accordingly, there exists the problem of providing a means for applying the necessary bonding pressure to laminated components without the necessity of costly heavy equipment. The present invention substantially avoids or entirely eliminates the problems related above by providing a device which effectively and economically fulfills the need just stated.

The principles of the present invention cover the concept of a two handled rolling device adapted to be manipulated by both hands of a user in such a way that one hand imparts forward and backward movement of the device over the laminate surface while the other hand imparts solely downward forces on the device so as to exert maximum bonding pressure on the laminate.

In its presently preferred embodiment, the device of the present invention comprises generally a rigid frame having two elongate arms which are disposed substantially perpendicularly to each other and means located at the juncture of the arms for rotatably mounting a pair of heavy generally cylindrical rollers, the rollers being partially hollow and internally mounted substantially at the longitudinal midpoints thereof and extending toward each other to a point adjacent the frame. A suitably shaped handle is disposed on the free end of each arm, and the device is constructed and arranged such that when in use one of the arms extends generally horizontally and is used for imparting the forward and backward motion to the device while the other arm extends generally vertically and is used for exerting the downward pressure on the device.

As more fully explained hereinbelow, the unique construction of the rollers and the manner of mounting them on the frame achieves several distinct advantages in connection with the intended use of the device. By providing a mounting adjacent the mid-point of each roller, the downward force on the device is distributed more evenly over the length of each roller which prevents both any tendency to bend or otherwise distort the mounting parts and also prevents any tendency for one end or the other of the rollers to bite into the surface of the laminate plastic layer, which would cause an irreparable scratch or groove. Further, the rollers are spaced very closely together adjacent the frame so as to present as unbroken a rolling surface as possible over the combined length of both rollers, thereby substantially eliminating the possibility of entrapping air bubbles between the laminate layers in the region between the rollers. Still further, by mounting the rollers internally thereof rather than externally at their outer ends, these ends are free of obstructions and are squared off to facilitate moving the rolling device into narrow spaces and into corners where perpendicularly disposed surfaces, for example, join to define the corner and where one or both of the surfaces is covered with the plastic layer.

Having thus briefly described the nature of the present invention, it is a principal object thereof to provide a laminate rolling device in the nature of a portable hand operated tool for applying bonding pressure to adhesively secured layers of a laminate structure.

It is another object of the the present invention to provide a laminate rolling device which facilitates the simultaneous application of forward and backward moving forces and downward pressure forces by manipulation of the device by both hands of a user.

It is still another object of the present invention to provide a laminate rolling device in which downward forces exerted thereon are distributed evenly over the length of a pair of rollers, and in which there are no lateral projections beyond the ends of the rollers so as to provide unobstructed free end faces.

It is yet another object of the present invention to provide a laminate rolling device which is rugged and durable for its intended purpose, yet is economical to manufacture and is easy to manipulate.

These and other objects and advantages of the present invention will be more readily apparent from an understanding of the following detailed description of a preferred embodiment of the invention when considered in conjunction with the accompanying drawings in which.

DETAILED DESCRIPTION OF THE INVENTION

Figures 1, 2, 3:
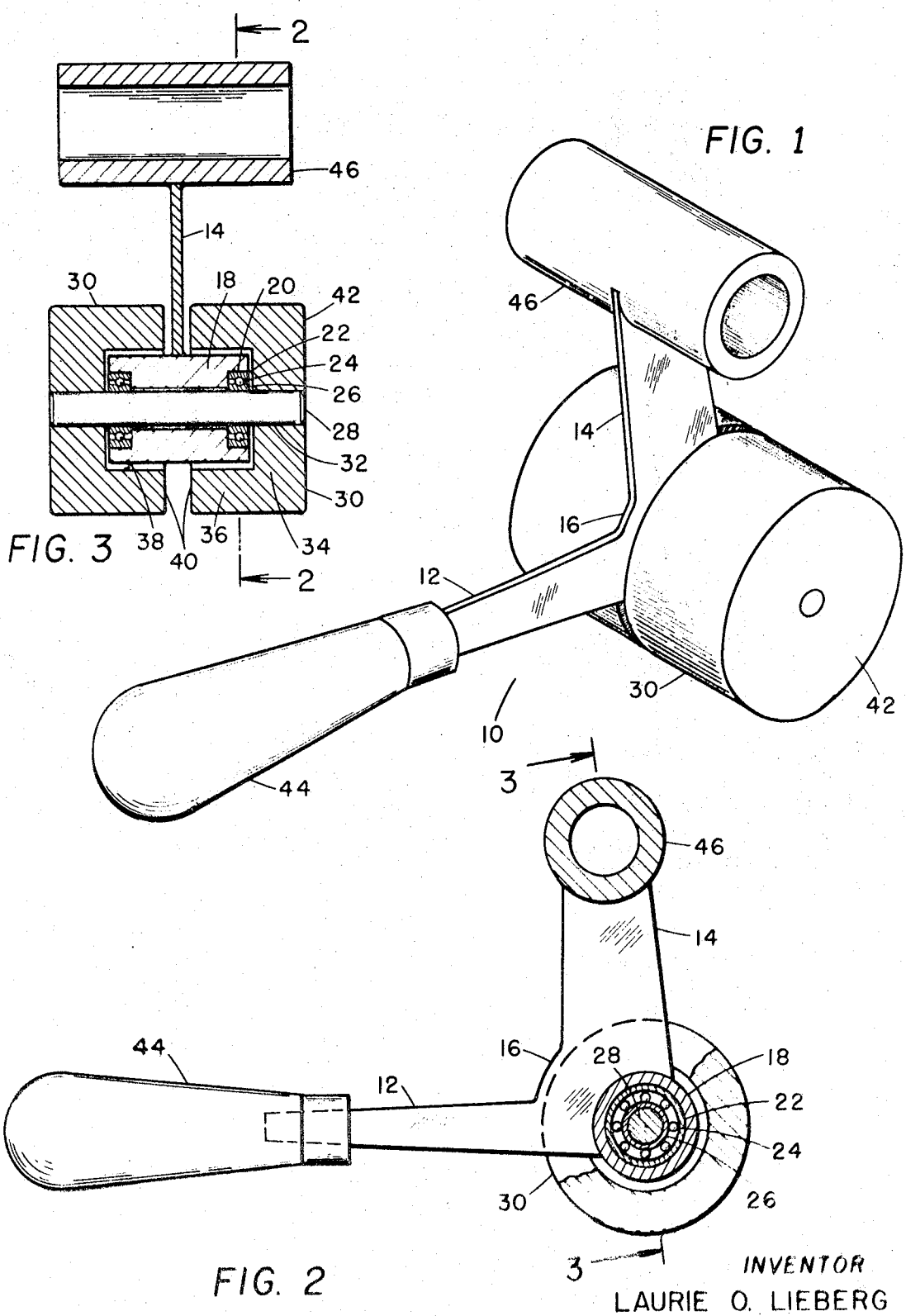
FIG. 1 is a perspective view of the laminate rolling device of the present invention.
FIG. 2 is a longitudinal sectional view taken on the line 2—2 of FIG. 3.
FIG. 3 is a vertical sectional view taken on the line 3—3 of FIG. 2.

Referring to the drawings, the laminate rolling device of the present invention comprises a rigid frame 10 having a pair of elongate arms 12 and 14 which project outwardly from a juncture 16, the arms 12 and 14 being disposed substantially perpendicularly with respect to each other. As shown in the drawings, the arms 12 and 14 are actually disposed at slightly less than a 90° angle so that when the device is in use the arm 14 will be substantially vertical while the arm 13 is elevated slightly from horizontal so that a user's hand will fit thereunder without scraping the surface being rolled. However, it is contemplated that the angle formed by the arms 12 and 14 may vary so long as it is within a range which can be said to be substantially perpendicular.

The juncture 16 is suitably shaped to be rigidly attached to, as by welding, or formed integrally with, a hollow cylindrical member 18 which, together with bearing means and a shaft, constitute part of a means for rotatably supporting a pair of heavy elongate rollers. More particularly, the member 18 extends laterally of the frame 10 for a predetermined distance on each side thereof, and is provided with a circular recess 20 projecting inwardly from each end thereof, the recesses 20 being of such diameter and depth as to snugly receive, as by a press fit, the outer race 22 of a ball bearing 24 or other suitable anti-friction bearing.

The inner race 26 of the bearing is fixedly mounted, as by a press fit, on a shaft 28 which extends through the member 18 and projects beyond the ends of the member 18 for a predetermined distance. A pair of rollers 30 are fixedly mounted on the shaft 28, such as by means of bores 32 in the rollers 30 in which the end portions of the shaft 28 which project beyond the ends of the member 28 are press fitted.

Each roller 30 is formed to have an annular disc area 34 which surrounds the bore 32 in each roller, and a longitudinally inwardly projecting annular flange portion 36 which defines a recess 38 sized to receive a portion of the cylindrical member 18. The rollers 30 terminate inwardly in flat faces 40 spaced as closely adjacent the frame 10 as is possible, and terminate outwardly in flat faces 42 beyond which the shaft 28 does not project. Thus it will be seen that the two rollers 30 present as unbroken a rolling surface as is possible over the length of the two rollers, and that the outer faces 42 provide a relatively sharp corner with the peripheral surface of the rollers to facilitate utilizing the rolling device in certain areas of a laminated structure which are otherwise difficult to reach with a rolling device having externally supported rollers with mounting structure on the outer faces of the rollers. It will also be seen that the internal mounting of the rollers is located substantially at the longitudinal midpoints thereof since the actual point of transfer of forces from the frame to the rollers is adjacent the bearings 24; it will be apparent that the shaft 28 need not project to the outer face 42 of each roller. By so locating the internal mounting point of the rollers 30 in relation to their opposite ends, the downward forces exerted on the frame 10 are evenly distributed over the disc area and flange area of the rollers so that an even bonding pressure is applied to the surface of the plastic layer. It is thus assured that uniform pressure will be applied to the plastic layer over the length of the rollers which prevents uneven adhesion in the bonding agent and the possibility of grooves in the surface of the plastic layer.

An elongate longitudinally disposed handle 44 is mounted on the free end of the arm 12 for grasping with the right hand of a right handed person. An elongate tubular shaped member 46 is fixedly attached, as by welding, to the upper end of the arm 14, this member being disposed laterally with respect to the plane of the frame 10 so as to be readily adaptable to being grasped by the left hand of a right handed person. It is, of course, apparent that the grasping member or handle 46 may take forms other than that shown in the drawings; it will, however, generally be elongate and be disposed with its axis substantially perpendicular to the plane of the frame 10 to facilitate grasping in the most comfortable position.

It can now be seen that the laminate rolling device of the present invention is constructed and arranged for two handed manipulation to exert a maximum amount of downward or bonding pressure on a laminate structure while being rolled back and forth over the surface thereof. By placing the laminate at the proper height above the floor, an operator can place his body substantially over the rolling device and lean with as much force as possible on the handle 46, thereby directing substantially all of the force directly downwardly to achieve maximum bonding pressure on the laminate while simultaneously moving the rolling device back and forth. The downward force on the handle 46 and arm 14 is transferred through the bearings 24 to the shaft 28, which is fixedly connected to the rollers 30 immediately adjacent the bearings 24, with the result that the downward force is delivered to the rollers substantially at the midpoint thereof and then evenly distributed over the length of the rollers. This assures that there is no tendency for the relatively sharp edges of the rollers to bite into the surface of the laminate.

What I claim and desire to secure by Letters Patent is:

1. A laminate rolling device comprising:
 (A) a frame having a pair of elongate arms projecting outwardly from a common juncture of said arms, said arms being disposed substantially perpendicularly to each other,
 (B) support means connected to said frame adjacent said juncture of said arms, said support means extending laterally with respect to the plane of said frame,
 (C) a pair of elongate rollers disposed adjacent the ends of said support means,
 (D) means mounting said rollers on said support means such that adjacent ends of said rollers are disposed in close proximity to said arms, and (E) a handle mounted on the free end of each arm.

2. A laminate rolling device as set forth in claim 1 wherein each of said rollers comprises a solid disc portion and a longitudinally extending circumferentially flanged portion, a portion of said support means and said mounting means being received within said flanged portion and the ends of said flanged portion being adjacent said arms.

3. A laminate rolling device as set forth in claim 2 wherein said support member is tubular and terminates within each of said rollers adjacent the longitudinal midpoint thereof, and said mounting means is disposed within said tubular support member adjacent the ends thereof.

4. A laminate rolling device as set forth in claim 3 wherein said mounting means comprises anti-friction bearing means mounted in said tubular support member and a shaft extending through said bearing means and having portions projecting beyond the ends of said support means, the disc portion of said rollers being mounted on the projecting portions of said shaft.

5. A laminate rolling device as set forth in claim 4 wherein said rollers are mounted on said projecting portions of said shaft such that the inner face of said disc portion of each roller is adjacent the corresponding outer end of said tubular support means, and said flanged portion of each roller extends inwardly of said tubular support means in overlying relationship therewith.

6. A laminate rolling device as set forth in claim 5 wherein said shaft terminates at least contiguous with the outer faces of said rollers.

References Cited
UNITED STATES PATENTS

| | | | |
|---|---|---|---|
| 352,351 | 11/1886 | Pope | 29—110.5 |
| 1,461,815 | 7/1923 | Bird | 29—110.5 |
| 2,321,511 | 6/1943 | Piercy | 15—230.11X |
| 2,680,873 | 6/1954 | Ernst | 15—230.11X |
| 3,127,299 | 3/1964 | Hecht | 156—579 |

ALFRED R. GUEST, Primary Examiner

U.S. Cl. X.R.

156—579